(12) United States Patent
Dutta

(10) Patent No.: US 11,244,064 B2
(45) Date of Patent: Feb. 8, 2022

(54) APPLICATION LEVEL DATA SECURITY

(71) Applicant: American Express Travel Related Services Company, Inc., New York, NY (US)

(72) Inventor: Siddhartha Dutta, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 206 days.

(21) Appl. No.: 16/452,150

(22) Filed: Jun. 25, 2019

(65) Prior Publication Data

US 2019/0392164 A1  Dec. 26, 2019

Related U.S. Application Data

(60) Provisional application No. 62/690,137, filed on Jun. 26, 2018.

(51) Int. Cl.
*G06F 21/62* (2013.01)
*H04L 9/08* (2006.01)
*G06F 21/60* (2013.01)

(52) U.S. Cl.
CPC ........ *G06F 21/6218* (2013.01); *G06F 21/602* (2013.01); *H04L 9/0825* (2013.01)

(58) Field of Classification Search
CPC ............... G06F 21/6218; G06F 21/602; G06F 21/6281; H04L 9/0825; H04L 2209/38; H04L 9/3239; H04L 9/3247
See application file for complete search history.

(56) References Cited

U.S. PATENT DOCUMENTS

| | | | |
|---|---|---|---|
| 7,003,110 B1* | 2/2006 | Jakobsson | G06F 21/10 380/45 |
| 10,057,243 B1* | 8/2018 | Kumar | H04L 63/0823 |
| 10,181,948 B1* | 1/2019 | Nenov | G06F 8/65 |
| 2019/0081990 A1* | 3/2019 | Roy | H04L 9/0891 |

\* cited by examiner

*Primary Examiner* — Meng Li
(74) *Attorney, Agent, or Firm* — Thomas | Horstemeyer LLP

(57) ABSTRACT

A system and method of data protection that provides the security of field level data protection with the ease of implementation and transparency of system level data protection at various layers is disclosed. The system utilizes blockchain technology to implement improved data protection. A smart contract application is deployed among all devices covered by the data protection system. Ledgers are similarly deployed either on each device or on dedicated ledger nodes to provide a record of all transactions occurring with the protected data. As a device writes data to a storage medium or initiates transmission of the data over a communication medium, the smart contract intercepts the data and applies a desired protection protocol to the data. As a result, enterprise wide security may be deployed that provides field level encryption without requiring modifications to existing applications or development of custom applications.

20 Claims, 7 Drawing Sheets

APPLICATION LEVEL DATA SECURITY

CROSS-REFERENCE TO RELATED APPLICATIONS

This Non-Provisional Patent Application claims priority to U.S. Provisional Patent Application Ser. No. 62/690,137, entitled "Transparent Protection of Data at an Application Level," and filed on Jun. 26, 2018, which is incorporated herein by reference in its entirety for all purposes.

FIELD

The disclosure generally relates to data security, and more specifically, to systems and methods for providing field level data security without requiring modifications to existing applications or needing to use custom applications.

BACKGROUND

There are several levels of data protection that may be used to secure sensitive data, including storage level data protection, field level data protection, and system level data protection. Storage level data protection (e.g., disks, drives, tapes) may be applied to an entire storage medium, such as by protecting against theft of the physical medium.

Field level data protection utilizes a desired data protection method (e.g., encryption, tokenization masking, hashing) on data after the data is entered into a device and prior to storage or transmission. A technical problem is that field level data protection typically needs customization of existing applications or development of custom applications that are aware of data fields requiring protection, such that the application is able to apply the protection to the data prior to storage or transmission. In addition, any utilities that may attempt to access the data (e.g., to search, read, write, or generate a report on the data) are similarly modified to access, modify, and/or rewrite the protected data, according to the selected data protection method. As a result, field level data protection becomes a very time consuming and an expensive method of protecting data.

System level data protection applies the desired data protection method to data in response to the data being written in a storage medium. Individual data files are protected as they are written to a storage medium in accordance with a security policy defined by the protection, but the data is unprotected when access to the data is requested by an application. System level data protection is configured to be transparent to a calling application or to a user. Access to data may be determined, for example, on the basis of a user's login credentials. For anyone with access to particular data, the data is transparently decrypted when read and transparently encrypted when written to a database or storage. A technical problem is that system level data protection allows data to be manipulated with applications, after the data is entered in an unprotected (or clear) state. Similarly, an application executing on a first device may transmit the data to a second device in the clear state. While the communication protocol may employ its own encryption used during transmission, the underlying data is in the clear state and only the transmission encryption needs to be defeated to obtain the data.

SUMMARY

Systems, methods, smart contracts, and blockchain networks (collectively, the "system") for transparent application level data security using a distributed ledger are disclosed. The system may intercept a system call to perform a read operation or a write operation on data. The system may determine a data protection policy to be applied to the system call. The system may apply the data protection policy to provide data protection on the data from the system call. The system may record a transaction associated with the applying the data protection policy on a distributed ledger.

In various embodiments, the system may propagate the recording the transaction to a second processor, wherein in response to the propagating the second processor records the transaction on a local ledger. Determining the data protection policy may be based on at least one of the system call, a system policy, or transaction data from the distributed ledger.

In various embodiments, applying the data protection policy may comprise encrypting the data from the system call during the write operation. Applying the data protection policy may comprise decrypting the data from the system call during the read operation. The data protection policy may comprise at least one encryption, hashing, tokenization, or masking.

In various embodiments, the system may further comprise extracting the data from the system call, in response to completing the step of intercepting the system call; and reinserting the data into the system call in response to completing of the applying the data protection policy.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
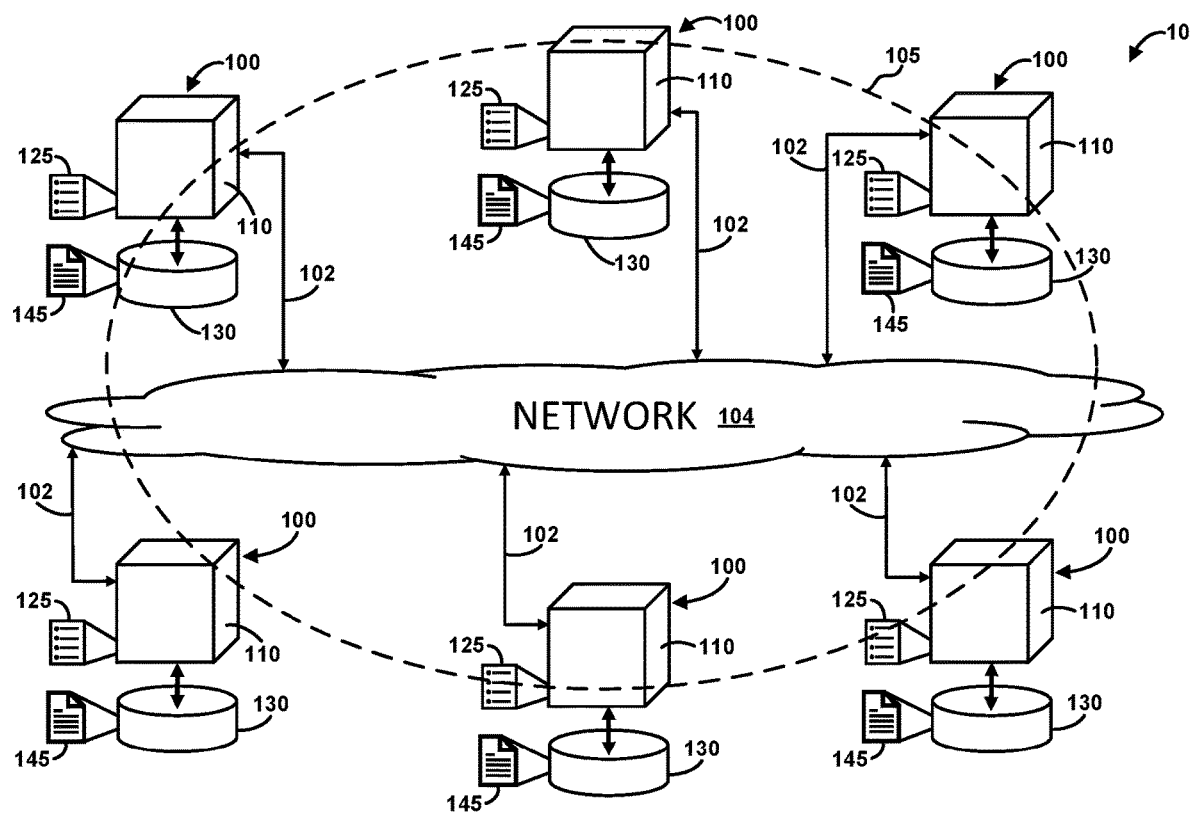
FIG. 1 illustrates a system for transparent application level data security, in accordance with various embodiments.

In various embodiments, systems and methods for transparent application level data security are disclosed. The system may provide the security of field level data protection with the ease of implementation and transparency of system level data protection. In that regard, the system may provide technical solutions to the technical problems found in typical data security processes. The system may utilize distributed ledger technology, such as blockchain, to aid in providing the improved data protection. The system may implement and deploy a smart contract protocol among one or more devices to enable the devices to interact with components in the system. Distributed ledgers may be deployed on one or more of the devices, or to dedicated ledger nodes, to provide a record of all transactions occurring with the protected data. For example, in response to a device writing data to a storage medium or initiating a transmission of the data over a communication medium, the smart contract may intercept or receive the data and apply a desired protection protocol to the data. Each transaction with the protected data may be written locally into the corresponding ledger for the device performing the transaction and replicated globally onto one or more of the other ledgers within the system.

In various embodiments, maintaining the ledgers as each transaction occurs allows the smart contract on each device to perform the required data protection operation on each data entry, as an application executing on the device requires or instantiates access to the data.

In various embodiments, each operation on the data may be fully or partially transparent to the application performing the operation on the device. For example, an application may request to store, read, or transmit data on the device. A security policy may define which data fields require protection, and logic within the smart contract on the device may be developed as a function of the security policies. As a result, system wide security may be deployed that provides field level encryption without requiring (or with minimal) modifications to existing applications or without (or with minimal) development of custom applications.

In various embodiments, the system may use a distributed ledger maintained by a plurality of computing devices (e.g., nodes) over a peer-to-peer network. Each computing device maintains a copy and/or partial copy of the distributed ledger and communicates with one or more other computing devices in the network to validate and/or write data to the distributed ledger. The distributed ledger may use features and functionality of blockchain technology including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the system may propagate to the connected peers within the blockchain network within a duration that may be determined by the block creation time of the specific distributed ledger technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of buying requests and purchases by performing cryptographic processes on data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. Further, by syncing data with the involved parties in real time (or near real time), the system may improve data integrity, data confidentiality, and data security, which may also improve the speed of the business process. For example, security personnel for the enterprise may monitor activity within one or more of the ledgers and suspicious or anomalous activity with respect to the sensitive data is easily detected and alerts or reports provided to the security personnel. The system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and as each block comprises a link to a previous block, a node may quickly detect a missing block and propagate a request for the missing block to the other nodes in the blockchain network.

In various embodiments, and with reference to FIG. 1, a system 10 for transparent application level data security is disclosed. System 10 may contemplate uses in association with web services, utility computing, pervasive and individualized computing, security and identity solutions, autonomic computing, cloud computing, commodity computing, mobility and wireless solutions, open source, biometrics, grid computing, and/or mesh computing. In various embodiments, system 10 may be an enterprise, such as, for example, a business, a university, a consortium, a government agency, and/or the like. System 10 may comprise one or more devices 100. One or more of the devices 100 may be in electronic communication via a network 104.

In various embodiments, each device 100 may include various hardware, software, and/or database components.

Each device 100 may take the form of a computer or processor, or a set of computers and/or processors or application specific integrated circuits (ASICs), although other types of computing units or systems may also be used. Each device 100 may include, for example, a server, a personal computer, a personal digital assistant, a cellular phone, a smartphone, an Internet of Things (IoT) device, and/or the like. Each device 100 may comprise any suitable network connected device configured to transmit and/or receive data within system 10. One or more devices 100 may comprise at least one computing device in the form of a computer or processor, or a set of computers/processors, although other types of computing units or systems may be used such as, for example, a server, web server, pooled servers, or the like. Each device 100 may also include software, such as services, APIs, and the like, configured to perform various operations discussed herein. In various embodiments, one or more devices 100 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, one or more device 100 may be located at a single physical location or distributed among multiple locations and various numbers of devices 100 may be included in system 10. One or more devices 100 may be entirely owned or hosted by system 10 or may be utilized on a contractual basis, such as, for example, under a Software as a Service (SaaS) contract, Infrastructure as a Service (IaaS) contract, Platform as a Service (PaaS) contract, public or private, or a combination thereof.

Figure 5:
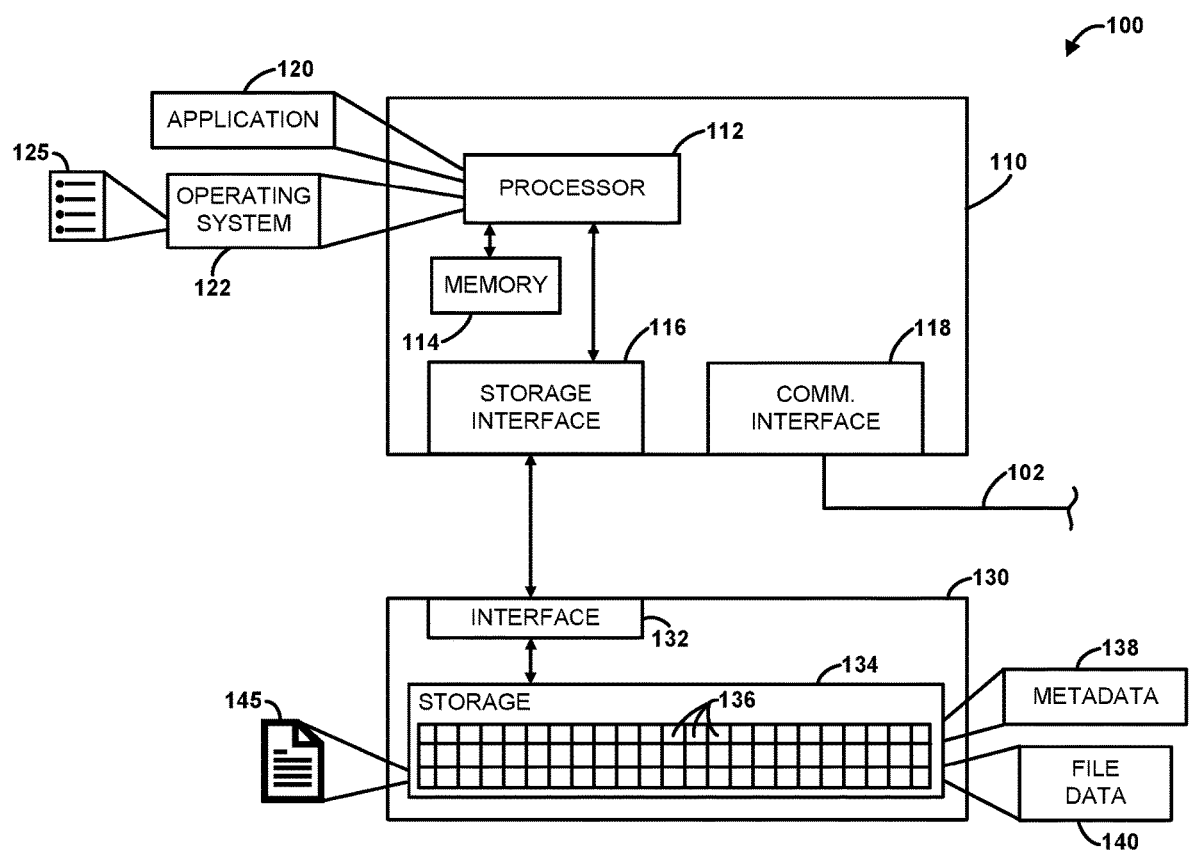
FIG. 5 illustrates an exemplary node for use in a system for transparent application level data security, in accordance with various embodiments.

In various embodiments, one or more devices 100 may include a processing component 110 and a storage component 130. One or more devices 100 may include one or more user interfaces, for input or output such as a keyboard, mouse, track ball, touch pad, touch screen, and/or a display. With reference to FIG. 5, and continued reference to FIG. 1, additional components of an exemplary processing component 110 and an exemplary storage component 130 are disclosed. Each processing component 110 may include a processor 112 and a memory 114. Memory 114 may be in electronic communication with processor 112. Processor 112 may include one or more microprocessors, co-processors, logic devices, and/or the like. Processor 112 comprising multiple microprocessors may execute in parallel or asynchronously. The logic device may include, for example, analog-to-digital converters, digital-to-analog converters, buffers, multiplexers, clock circuits, or any other peripheral devices required for operation of processor 112. Memory 114 may include a single memory device or multiple memory devices and may be volatile memory, non-volatile memory, or a combination thereof.

Each processing component 110 may also comprise a storage interface 116 in electronic communication with processor 112. Storage interface 116 may be configured to provide a physical connection to storage component 130. For example, in response to storage component 130 comprising an internal hard drive, storage interface 116 may include, for example, appropriate cables, drivers, and the like to enable the physical connection. As a further example, in response to storage component 130 comprising a removable storage medium, such as a CD-ROM drive, DVD-ROM drive, USB drive, memory card, and the like, storage interface 116 may comprise an interface, a port, a drive, or the like configured to receive the removable storage medium and any additional hardware required to operate the interface, the port, the drive, or the like.

Each processing component 110 may also comprise a communication interface 118 in electronic communication with processor 112. Communication interface 118 may be, for example, a serial communication port, a parallel communication port, an Ethernet communication port, or the like. Device 100 may comprise a communication medium 102. Communication medium 102 may be configured to enable electronic communication between processing component 110 and network 104. Communication medium 102 may be a cable, such as an Ethernet cable. In various embodiments, communication interface 118 may be configured for wireless communication via infrared, radio frequency (RF), optical, BLUETOOTH®, or other suitable wireless communication methods. Communication medium 102 may comprise one or more antennas configured to enable communication over free-space. Network 104 may be an intranet, the Internet, or a combination thereof. Each device 100 in system 10 may communicate with another device either directly or indirectly via network 104.

In various embodiments, storage component 130 may comprise any suitable database, data structure, or the like capable of storing and/or maintaining data. Storage component 130 may comprise, for example, a hard drive, a solid-state drive, a removable memory card, and the like. Storage component 130 may comprise an interface 132 configured to enable communications with processing component 110, via storage interface 116. For example, storage interface 116 in processing component 110 and interface 132 in the storage component 130 define the physical layers between the processing component 110 and storage component 130, respectively, establishing communication therebetween. In various embodiments, storage component 130 includes block storage 134, with multiple blocks 136, in which data and files are saved. Each file stored in the storage component 130 may include metadata 138 and file data 140. Metadata 138 for a file includes, for example, pointers to particular blocks 136 in block storage 134 at which the file data 140 for the file is stored.

In various embodiments, one or more devices 100 may be deployed within system 10 as part of, or to form, a distributed ledger network. The distributed ledger network may be based on one or more digital ledger technologies ("DLT"), as described herein. For example, the distributed ledger network may implement a DLT technology such as blockchain, tangle, or the like.

In various embodiments, the distributed ledger network may comprise a blockchain network configured to maintain a blockchain (e.g., ledger 145). The blockchain network may be a peer-to-peer network that is private, federated, and/or public in nature (e.g., the ETHEREUM® system, the Bitcoin system, the HYPERLEDGER® Fabric system, etc.). Federated and private networks may offer improved control over the content of the blockchain and public networks may leverage the cumulative computing power of the network to improve security.

The blockchain network may be based on any blockchain technology such as, for example, ETHEREUM®, OPENCHAIN®, Chain Open Standard technology, HYPERLEDGER® Fabric, CORDA®, Connect™, Sawtooth™, etc. The blockchain (e.g., ledger 145) may comprise a system of blocks containing data that are interconnected by reference to the previous block. Each block may link to the previous block and may include a timestamp. Data can be added to the blockchain by establishing consensus between the blockchain nodes based on proof of work, proof of stake, practical byzantine fault tolerance, delegated proof of stake, or other suitable consensus algorithms.

One or more of the devices 100 in the blockchain network may be in electronic communication with each other, and may be configured to write blocks to the blockchain and validate blocks of the blockchain. One of more devices 100 may run applications to interact with the blockchain network, communicate with other devices 100, perform crypto operations, and otherwise operate within system 10. For example, one or more devices 100 may run a client application that can be a thin client (web), hybrid (i.e. web and native, such as iOS and ANDROID® systems), or native application to make API calls to interact with the blockchain, such as a web3 API compatible with blockchain databases maintained by the ETHEREUM® system. A blockchain address may be uniquely assigned to each blockchain node or to function as a unique identifier for each participant in the blockchain network.

As an example, and with specific reference again to FIG. 1, each device 100 may be a node in the blockchain network and include a ledger 145 stored in storage component 130. As a further example, and with reference to FIG. 2, a first portion of the devices (devices 100a) may be configured to include the ledger 145 and a second portion of the devices (devices 100b) may be in communication with at least one of the devices 100a to record transactions and interact with the blockchain network.

Figure 4:
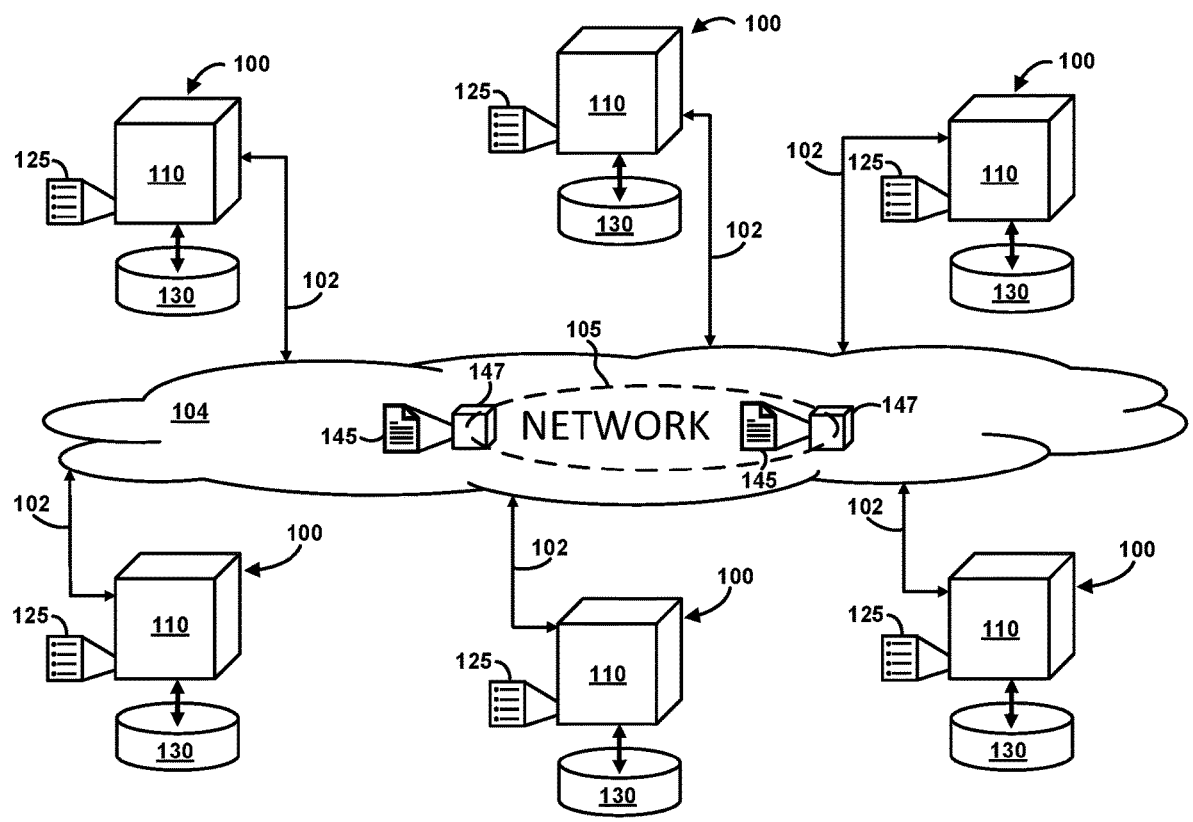
FIG. 4 illustrates a system for transparent application level data security having dedicated notes storing a ledger, in accordance with various embodiments.

As a further example, and with reference to FIG. 4, system 10 may include one or more dedicated nodes 147. Each dedicated node 147 may be configured to store the ledgers 145. In various embodiments, each of the dedicated nodes 147 are not intended to manage data within system 10, but rather, to simply manage the ledgers 145. In that regard, one or more devices 100 may be in electronic communication with one or more dedicated nodes 147, and may be configured to record transactions and interact with the blockchain network via the one or more dedicated nodes 147.

In various embodiments, the blockchain network may be implemented as a private blockchain network. In a private blockchain network, each device 100 requires authentication to be initially registered to the network. Access to the blockchain network may be accomplished by any standard registration process including, for example, a request and authorization process, where a new device 100 issues a request to be authorized as a node and a registration server authorizes access to the private blockchain network.

In various embodiments, the blockchain network may be implemented on a public blockchain network. In a public blockchain network, a set of existing devices 100 with an established network may be utilized. Additional devices 100 may join the blockchain network according to the policies of the public network.

In various embodiments each participant in the blockchain network may register with system 10, the blockchain network, and/or an existing trust participant (e.g., an identity provider), and may be assigned and provided a private key and public key pair. For example, in a permissioned blockchain consortium, each participant may procure a public key and private key pair from a third-party certificate authority (e.g., DIGICERT®, VERISIGN®, etc.). For example, in a blockchain consortium, one of the participants may initiate and create the ledger 145 and may invite (or receive invitation requests from) one or more of the other participants to join the blockchain consortium. Invited participants may accept the request by transmitting a configuration request to join the blockchain consortium. The configuration request may be validated and/or approved by existing participants of the blockchain consortium using digital signature verification. The private key may be stored with each respective participant, and as discussed further herein, data can be encrypted with the public key prior to writing to ledger 145.

Figure 3:
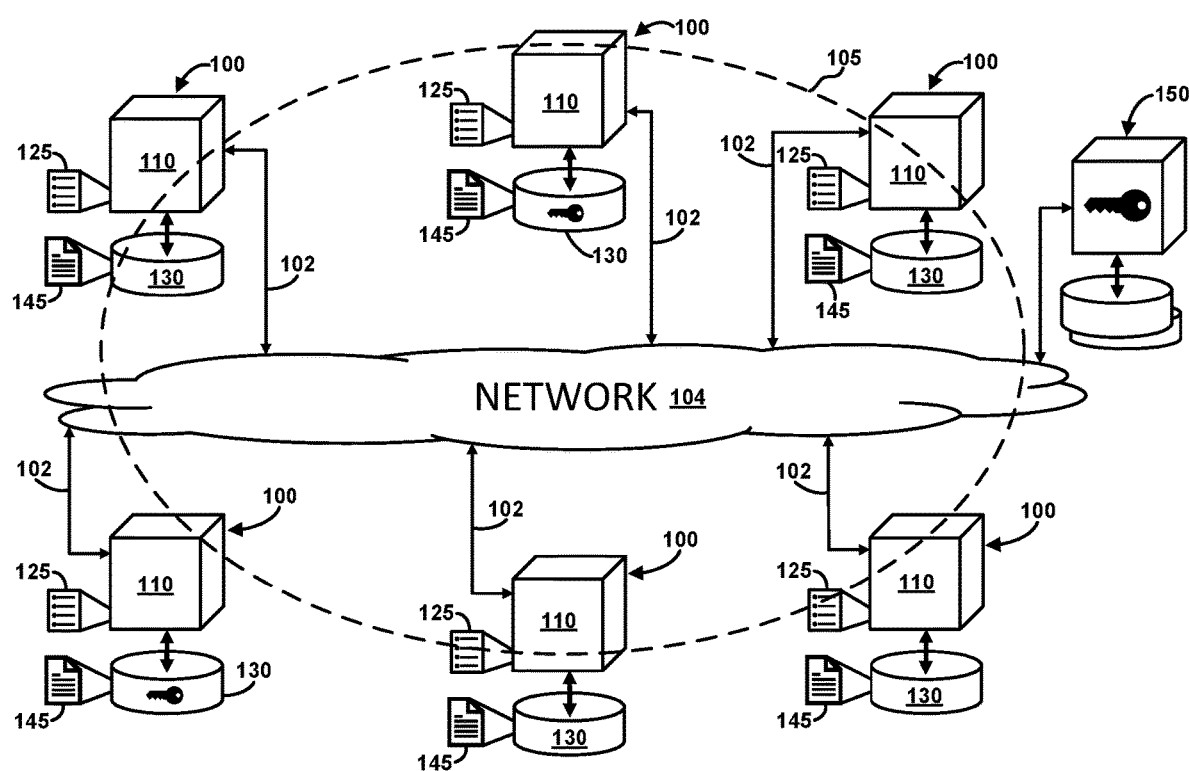
FIG. 3 illustrates a system for transparent application level data security having a key server, in accordance with various embodiments.

In various embodiments, and with reference to FIG. 3, system 10 may include a key server 150 configured to provide encryption keys (e.g., the public key and private key pair) to the device for encryption according to the system protocols. It is contemplated that still other methods of establishing secure participation in the private network may be utilized without deviating from the scope of the invention. When a device 100 is authorized to participate in the blockchain network, key server 150 (or a registration server) may also provide the device 100 with a smart contract 125. Optionally, any standard deployment process for an enterprise may be utilized to provision new devices 100 with a smart contract 125 and/or a ledger 145 as required by the application requirements. As will be discussed in detail below, the smart contract 125 and ledger 145 work together to provide transparent field level data protection.

In various embodiments, key server 150 may use a Hierarchical Deterministic (HD) solution to enable the creation of one or more child keys from one or more parent keys in a hierarchy. Each child key may be assigned to a participant in the blockchain network. For example, key server 150 may use BIP32, BIP39, and/or BIP44 to generate an HD tree of public addresses.

In various embodiments, and with reference again to FIG. 5, processor 112 in each device 100 may be configured to execute applications 120, as well as an operating system 122 for the device 100. Operating system 122 manages the resources of the device 100 and provides common services between applications 120 executing on processor 112. Operating system 122 may be stored on storage component 130, within memory 114, or a combination thereof. Operating system 122 may vary between devices 100 and is configured to control the hardware components for the associated device 100. Processor 112 may be configured to execute operating system 122 and each of the applications 120 stored in memory 114 or storage component 130, including smart contract 125.

Smart contract 125 may be a device driver, application programming interface (API), or other such routine or protocol. Smart contract 125 may be deployed at the data access layer, stored in memory 114 or on storage component 130 and configured to be loaded onto the device 100 and managed or operated by operating system 122. During power-up of the device 100 or during initialization of operating system 122, operating system 122 detects the presence of and launches smart contract 125. In response to being launched, smart contract 125 may monitor data and perform data protection as required by the device. In various embodiments, smart contract 125 may comprise an executable that writes data to ledger 145 in a predetermined format based on predetermined function parameters passed by an API call or the like. Smart contract 125 may include a program written in a programming language such as, for example, Go, NODE.JS®, JAVA®, KOTLIN®, Solidity, or any other suitable smart contract programming language.

Figure 6:
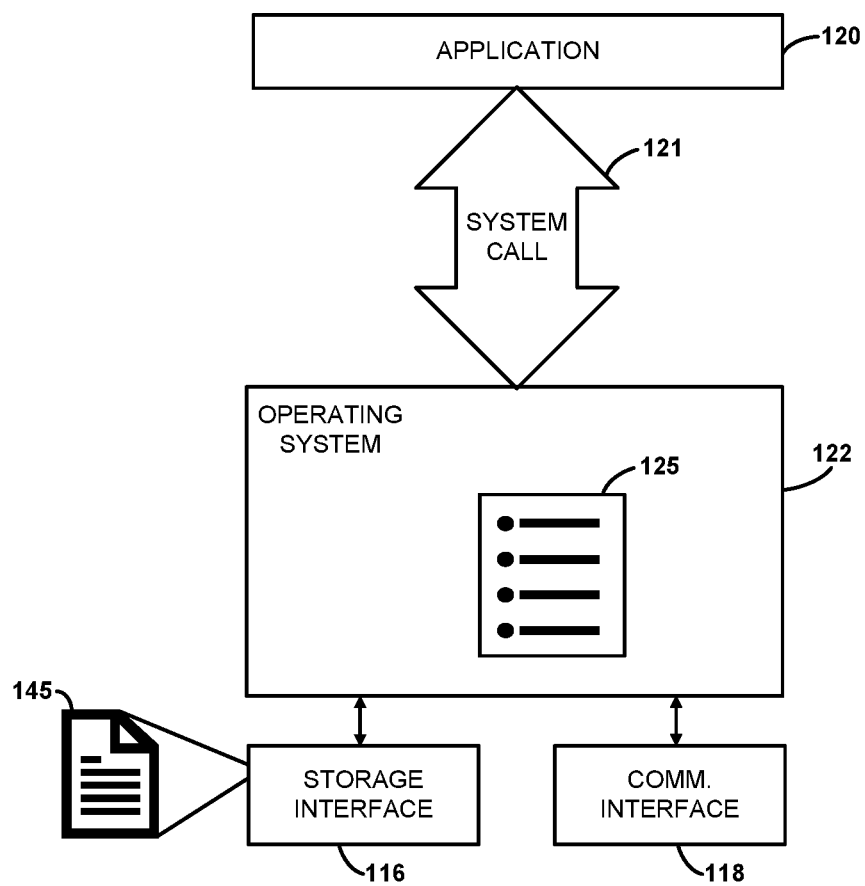
FIG. 6 illustrates a schematic representation of an exemplary node for use in a system for transparent application level data security, in accordance with various embodiments.

In operation, and with reference to FIG. 6, smart contract 125 executes on processor 112 and monitors system calls 121 made by applications 120 to provide transparent field level data protection. As discussed herein, smart contract 125 is launched by operating system 122 during power-up. Smart contract 125 may be configured to monitor system calls 121 made by an application 120 and compare the system calls 121 to a rules database embedded within smart contract 125, or to compare the system calls 121 to entries in one of the ledgers 145. In response to smart contract 125 identifying data that needs protecting or protected data that needs to be decrypted, unmasked, or the like, smart contract 125 utilizes an appropriate data protection method to encrypt or decrypt the data. The data protection mechanism, client, API, and/or the like may be selected according to the system requirements.

Figure 7:
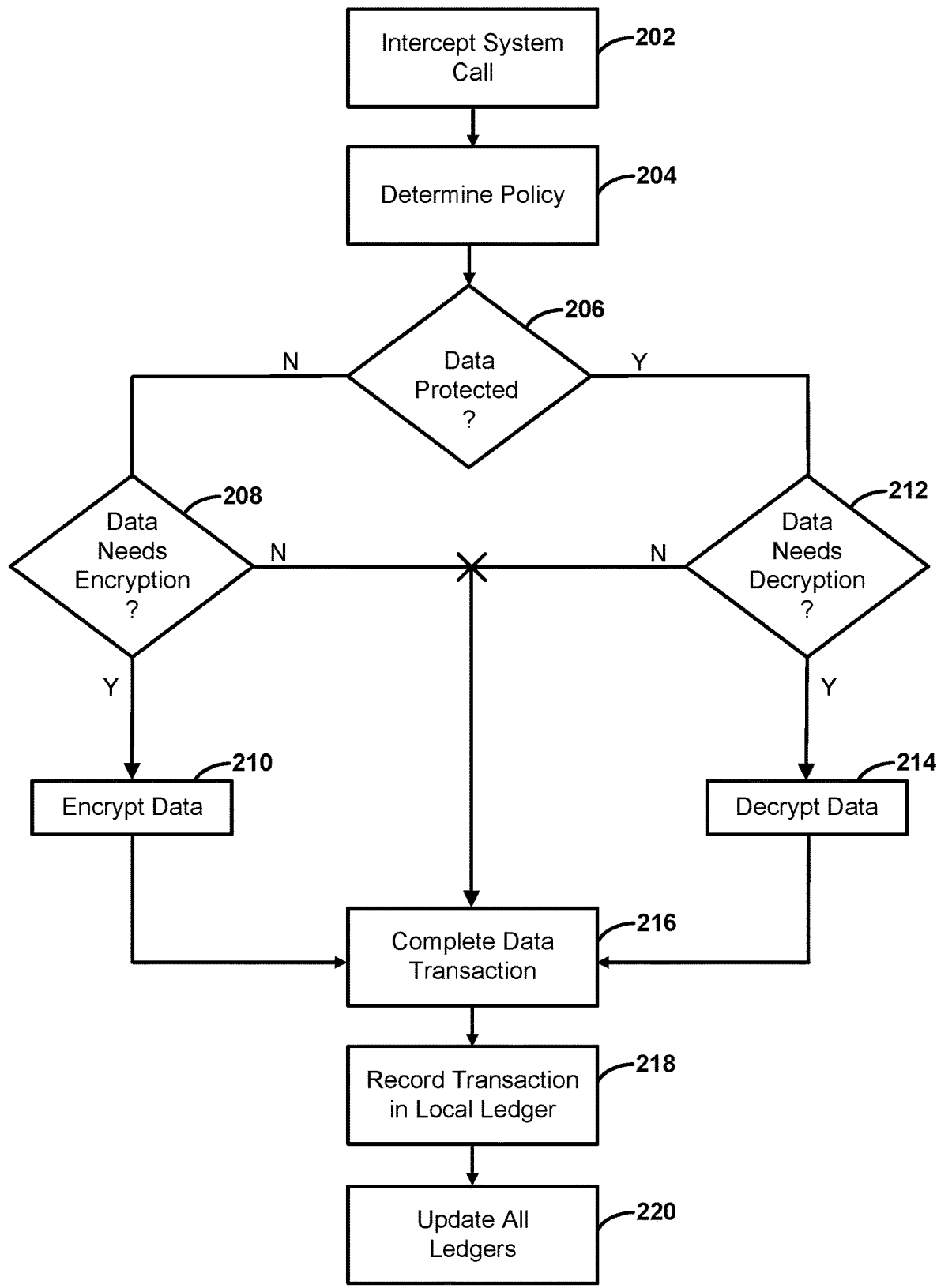
FIG. 7 illustrates a process flow for a method of transparent application level data security, in accordance with various embodiments.

Referring now to FIG. 7 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 7, but also to the various system components as described above with reference to FIGS. 1-6. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, and with specific reference to FIG. 7, a method for application level data security is disclosed. The system may intercept a system call 121 (Step 202). For example, smart contract 125 may be configured to execute at a data access layer to intercept the system call 121. The system call 121 may be, for example, an execution to read or write data. The system call 121 may be issued to access data in a database or to write new data to a database. Smart contract 125 may intercept the system call 121 based on any configuration or process. For example, in response to receiving the system call 121, the device 100 may be configured to automatically route the system call 121 to smart contract 125. In response to intercepting the system call 121, the system may determine a data protection policy (Step 204). For example, smart contract 125 may be configured to determine the data protection policy for system 10. Smart contract 125 may access the ledger 145 present on the device 100 to determine if the data within the system call 121 is to be protected or not. If the data is to be protected, details of the type of data protection are stored in the ledger entry for the data (e.g., as metadata). For example, smart contract 125 may pass parameters regarding the system call 121, and based on the parameters smart contractor 125 may determine the type of data protection to be applied. For example, the type of data protection may be encryption, tokenization, hashing, masking, and the like. Smart contract 125 utilizes the type of data protection indicated in the ledger 145 to inspect the data and determine whether the data is clear data in need of protection or encrypted data that needs to be made clear.

In various embodiments, data may be referred to herein as encrypted data or clear data. Clear data refers to data that has no data protection. Encrypted data refers to data that is protected. "Encrypted" is not intended to be limited only to data that has undergone an encryption process, but could refer to data that is protected by any method of data protection including, for example, encryption, tokenization, hashing, and/or masking. Complementary data protection functions are performed to convert data between clear data and encrypted data, wherein the type of data protection is selected according to the system's requirements. In various embodiments, the type of protection needed based on type of data, system requirements, or the like may be coded in smart contract 105.

The system may determine whether the data in the system call 121 is protected (Step 206). For example, smart contract 125 may be configured to determine whether the data in the system call 121 is protected (e.g., clear data) or not (e.g., encrypted data). Smart contract 125 may determine the protection using any suitable process. For data needing or requiring protection, smart contract 125 is operative to utilize the data protection method as identified in the ledger entry for the data (e.g., as metadata 138 or file data 140 in ledger 145). Smart contract 125 may be configured to comprise any required knowledge to execute the data protection method, including, for example, a remote Uniform Resource Locator (URL) for key server 150, a tokenization server, or a web services server along with any necessary credentials to authenticate itself to the server.

In various embodiments, in response to the data from the system call 121 not being protected, the system may determine whether the data needs encryption (Step 208). For example, smart contract 125 may determine whether the data requires protection based on a system policy and/or according to the type of system call 121 to be performed (e.g., a data write). In various embodiments, the data may not require protection (e.g., based on the type of data, system requirements, etc.) and smart contract 125 may pass the data without protecting or decrypting the data. Smart contract 125 may parse the system call 121 to determine the type of system call 121 to be performed. Based on the type of system call, smart contract 125 may determine whether the data requires protection and/or the type of data protection method. The system may execute the data protection method on the data to encrypt the data (Step 210). For example, in response to determining that the data needs protection, smart contract 125 may execute the determined data protection method to encrypt the data. The determined data protection method may be executed to perform operations on the data to encrypt the (clear) data.

In various embodiments, in response to the data from the system call 121 being protected, the system may determine whether the data needs decryption (Step 212). For example, smart contract 125 may determine whether the data needs decryption based on a system policy and/or according to the type of system call 121 to be performed (e.g., a data read). Smart contract 125 may parse the system call 121 to determine the type of system call 121 to be performed. Based on the type of system call, smart contract 125 may determine whether the data requires decryption and/or the type of data decryption method to use. The system may execute the data protection method on the data to decrypt the data (Step 214). For example, in response to determining that the data needs decryption, smart contract 125 may execute the determined data decryption method to decrypt the data. The determined data decryption method may be executed to perform operations on the data to decrypt the (encrypted) data.

In response to the system encrypting, decrypting, or performing no operation on the data from the system call 121, the system may complete the data transaction (Step 216). For example, smart contract 125 may pass the system call 121 with the data in the desired form to operating system 122. Operating system 122 may execute or perform the system call 121 according to the type of system call 121. Operating system 122 may, for example, write data that has been newly encrypted to storage component 130 or pass data that has been newly decrypted to an application 120. Further, if no change in protection to the data is required, smart contract 125 may pass the system call 121 with the existing data to operating system 122 for completion.

Figure 2:
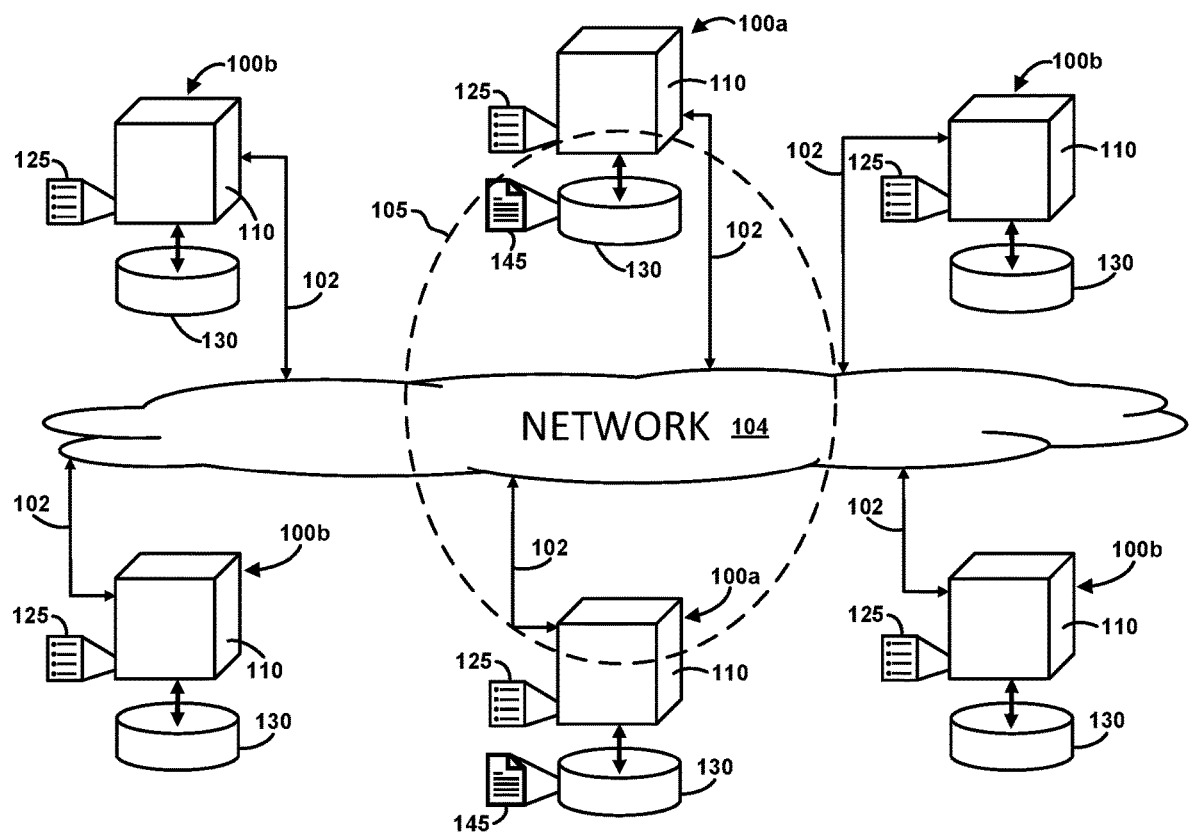
FIG. 2 illustrates a system for transparent application level data security wherein a portion of nodes include a ledger, in accordance with various embodiments.

In response to completing the data transaction, the system may record the transaction in a local ledger 145 of the device 100 (Step 218). For example, smart contract 125 may be configured to record data regarding the data protection (or decryption) to the local ledger 145. Initially, smart contract 125 may create a new record in the local ledger 145 for device 100. In response to each device 100 of system 10 including a local copy of ledger 145 (e.g., as depicted in FIG. 1), smart contract 125 may write to the local copy of ledger 145. In response to a portion of devices 100b not including a local copy of ledger 145 (e.g., as depicted in FIG. 2), smart contract 125 may communicate with a device 100a that does include a ledger 145, to complete the write to the local copy of ledger 145. In response to the system employ dedicated nodes 147 (e.g., as depicted in FIG. 4), smart contract 125 may communicate with a dedicated node 147 to maintain the record of data transactions on the ledger 145.

In response to recording the transaction into a local copy of ledger 145, the system may perform an update across all ledgers 145 (Step 220). For example, smart contract 125 may be configured to perform a global ledger update 105 to update the recorded transaction across all ledgers 145. Global ledger update 105 is illustrated in FIGS. 1-3 as a ring connecting each device 100 with a ledger 145. Each device 100 transmits any new records created for the local ledger 145 since the prior global ledger update to each of the other devices 100. As a result, every ledger 145 is updated with a record of every data transaction on the distributed ledger network. In various embodiments, the global ledger update 105 may occur at a near real-time update rate such that each device 100 maintains an accurate record of data transactions within the distributed ledger network. It is contemplated that a near real-time update rate may be tens or hundreds of milliseconds. Preferably, near-real time is less than ten or in the tens of milliseconds and may be a function of the physical proximity of nodes to each other within an enterprise or within a service provider and as a function of transmission delays between devices 100.

In various embodiments, wherein the distributed ledger network comprises blockchain technology (or similar technology), the global ledger update 105 may occur by propagating the write to one or more consensus participants in the blockchain network. The consensus participants may achieve consensus and add the write to the ledger 145. For example, the consensus participants may achieve consensus using proof of work, proof of stake, practical byzantine fault tolerance, delegated proof of stake, or other suitable consensus algorithm. The consensus participants may complete the write using any suitable technique. In response to achieving consensus and completing the write, the consensus participants may transmit a write confirmation to the device 100 originating the write. The write confirmation may comprise data indicating that the write was successfully written to ledger 145. In various embodiments, the write confirmation may also comprise data pointing to the location of the write on ledger 145, such as a uniform resource locator (URL), or the like.

In various embodiments, and with reference again to FIGS. 1, 5, and 6, an exemplary system 10 and blockchain network will be discussed in further detail. The illustrated blockchain network includes six devices 100. It is contemplated that one of the devices 100 is a provisioning, or master, node used to set up the blockchain network. Each of the other devices 100 requests permission from the master node for entrance into the blockchain network and provides authentication credentials to the master node. Once the provisioning node verifies that the requesting node is allowed to participate on the blockchain network based on the authentication credentials, the provisioning node transmits a copy of the smart contract 125 and an initial ledger 145 to each of the new devices 100. The initial ledger 145 may include existing records from prior transactions or may be a genesis ledger, populated with a number of blocks to establish a set of rules by which data is to be protected within the private blockchain network. The provisioning node may further generate a private key and obtain a signed certificate from a Certificate Authority for each new node and use it to sign the ledger entry after performing a data protection operation for subsequent communication with other devices 100 on the network 104. The signature may be read from local ledgers corresponding to the other devices 100 on the network to provide the other devices 100 the required authentication and non-repudiation of subsequent data protection operations and ledger entries.

After establishing the blockchain network, data may be entered on one of the devices 100 via a user interface and an application 120 executing on the device 100. Either the smart contract 125 or the ledger 145 includes rules on whether the data is to be protected and the method of data protection to be used. When the data is initially entered, it typically resides in a clear form in transitory memory, such as random access memory (RAM) within the device 100. The application 120 then issues a system call 121 to write the data to persistent, or non-transitory memory, such as the storage component 130. The smart contract 125 intercepts the system call 121 and determines whether the data is to be protected prior to writing the data to the storage component 130. Although the application may need a setting or property file adjusted to permit access of the data generated by the application within the smart contract, because the smart contract 125 is configured to intercept the system call, there are no modifications required to the software for the existing applications 120 and no custom software or Software Development Kit (SDK) is required to provide the data protection to the data at a field level. Rather, the smart contract 125 extracts the data from the system call 121 and performs the data protection routine on the data according to the policy established by the system 10. The encrypted data is then reinserted within the system call 121 and written to the storage component 130. The metadata for the data to be stored is written to the local ledger 145 along with the information required to perform the data protection routine. The metadata includes, for example, a pointer to the location at which the data is stored, the type of data stored, a data field name, a timestamp of the data, and the type of data protection utilized, whether the data is encrypted or clear, a pointer to an encryption key, an encryption algorithm utilized (or an equivalent metadata information for tokenization, masking, or hashing), a digital signature of a hash, and the like.

In various embodiments, the application 120 executing on the device 100 may receive an instruction to transmit data to another device 100. The application generates a data packet for transmission over the network 104 and generates the required system calls 121 to initiate the transmission. Similar to the system call to write data to the storage component 130, the smart contract 125 intercepts the system call to transmit data to another device 100. The smart contract 125 may access the ledger 145 to determine whether the data to be transferred is to be encrypted and the method by which it is to be encrypted. The smart contract 125 may also determine from the ledger 145 records whether the data to be transmitted is presently in an encrypted form or whether the data is clear data. If the data is clear data and should be encrypted, the smart contract 125 may extract the data and encrypt it in a similar manner to that described above prior to transmission to the other device 100. When data is being transmitted, it is desirable to update the ledger 145 entries of each device 100 rapidly such that the receiving device 100 is aware of the present state of the data. Consequently, the global ledger update is executed at a suitable update rate such that the receiving node is able to reference its local ledger 145 to determine the state of the data received. The global ledger update allows for a real-time, or near real-time, tracking of data within the private blockchain network.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of the system, or one or more subcomponents of the system, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In various embodiments, one or more servers discussed herein may include application servers (e.g., WEB-SPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems, etc.).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. In various embodiments, any database may also include a no-SQL database, a key-value database, an in-memory database, a GPU database, and/or the like. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in the system, including in one or more databases, may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, integrated into any other application server components, reside within another computing device, or take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements.

Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multithreaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    intercepting, by a processor, a system call to perform a read operation or a write operation on data;
    determining, by the processor, a type of data protection for the data associated with the system call based at least in part on accessing a distributed ledger;
    determining, by the processor, a data protection policy to be applied to the system call based at least in part on the type of data protection;
    applying, by the processor, the data protection policy to provide data protection on the data from the system call; and
    recording, by the processor and on the distributed ledger, a transaction associated with the applying the data protection policy.

2. The method of claim 1, further comprising propagating, by the processor, the recording of the transaction to a second processor, wherein propagating the recording of the transaction causes the second processor to record the transaction on a local ledger.

3. The method of claim 1, wherein determining the data protection policy is further based on at least one of the system call, a system policy, or transaction data from the distributed ledger.

4. The method of claim 1, wherein the applying the data protection policy comprises encrypting the data from the system call during the write operation.

5. The method of claim 1, wherein the applying the data protection policy comprises decrypting the data from the system call during the read operation.

6. The method of claim 1, wherein the data protection policy comprises at least one encryption, hashing, tokenization, or masking.

7. The method of claim 1, further comprising:
    extracting, by the processor and in response to the intercepting the system call, the data from the system call; and
    reinserting, by the processor and in response to the applying the data protection policy, the data into the system call.

8. A system comprising:
    a processor; and
    a tangible, non-transitory memory configured to communicate with the processor, the tangible, non-transitory memory having instructions stored thereon that, in response to execution by the processor, cause a smart contract to perform operations comprising:
        intercepting, by the smart contract, a system call to perform a read operation or a write operation on data;
        determining, by the smart contract, a type of data protection for the data associated with the system call based at least in part on accessing a distributed ledger;
        determining, by the smart contract, a data protection policy to be applied to the system call based at least in part on the type of data protection;
        applying, by the smart contract, the data protection policy to provide data protection on the data from the system call; and
        recording, by the smart contract and on the distributed ledger, a transaction associated with the applying the data protection policy.

9. The system of claim 8, further comprising propagating, by the smart contract, the recording of the transaction to a second processor, wherein propagating the recording of the transaction causes the second processor to record the transaction on a local ledger.

10. The system of claim 8, wherein determining the data protection policy is further based on at least one of the system call, a system policy, or transaction data from the distributed ledger.

11. The system of claim 8, wherein the applying the data protection policy comprises encrypting the data from the system call during the write operation.

12. The system of claim 8, wherein the applying the data protection policy comprises decrypting the data from the system call during the read operation.

13. The system of claim 8, wherein the data protection policy comprises at least one encryption, hashing, tokenization, or masking.

14. The system of claim 8, further comprising:
    extracting, by the smart contract and in response to the intercepting the system call, the data from the system call; and
    reinserting, by the smart contract and m response to the applying the data protection policy, the data into the system call.

15. A blockchain network including a plurality of nodes registered to the blockchain network, wherein at least a first portion of the plurality of nodes include a ledger, wherein at least a second portion of the plurality of nodes include a smart contract operative to provide data protection, and wherein in response to the smart contract being executed by a first node from the plurality of nodes the smart contract is configured to perform operations comprising:
    intercepting, by the smart contract, a system call to perform a read operation or a write operation on data;

determining, by the smart contract, a type of data protection for the data associated with the system call based at least in part on accessing a first local ledger;

determining, by the smart contract, a data protection policy to be applied to the system call based at least in part on the type of data protection;

applying, by the smart contract, the data protection policy to provide the data protection on the data from the system call; and recording, by the smart contract and on the first local ledger, a transaction associated with the applying the data protection policy.

16. The blockchain network of claim 15, further comprising propagating, by the smart contract, the recording the transaction to a second node from the plurality of nodes, wherein propagating the recording of the transaction causes the second node to record the transaction on a second local ledger.

17. The blockchain network of claim 15, wherein determining the data protection policy is further based on at least one of the system call, a system policy, or transaction data from the first local ledger.

18. The blockchain network of claim 15, wherein the applying the data protection policy comprises encrypting the data from the system call during the write operation.

19. The blockchain network of claim 15, wherein the applying the data protection policy comprises decrypting the data from the system call during the read operation.

20. The blockchain network of claim 15, wherein determining the type of data protection for the data is further based at least in part on a type of system call.

* * * * *